United States Patent [19]

Hains

[11] Patent Number: 5,025,250
[45] Date of Patent: Jun. 18, 1991

[54] MATRIX DISPLAY DEVICE

[75] Inventor: Ralph N. Hains, Cardiff, United Kingdom

[73] Assignee: U.S. Philips Corporation, New York, N.Y.

[21] Appl. No.: 327,224

[22] Filed: Mar. 22, 1989

[30] Foreign Application Priority Data

Jun. 10, 1988 [GB] United Kingdom ............... 8813778

[51] Int. Cl.⁵ ................... G09G 3/00; G09G 3/36
[52] U.S. Cl. ..................... 340/811; 340/765; 340/784; 350/333
[58] Field of Search ............ 340/719, 765, 784, 811, 340/783, 785, 786, 825.79, 825.94; 350/333, 334

[56] References Cited

U.S. PATENT DOCUMENTS

| | | | |
|---|---|---|---|
| 4,223,308 | 9/1980 | Baraff et al. | 340/719 |
| 4,709,992 | 12/1987 | Ueno | 350/333 |
| 4,715,685 | 12/1987 | Yaniv et al. | 350/334 |
| 4,731,610 | 3/1988 | Baron et al. | 340/765 |
| 4,748,445 | 5/1988 | Togashi et al. | 340/811 |
| 4,794,385 | 12/1988 | Kuijk | 340/719 |
| 4,810,059 | 3/1989 | Kuijk | 350/333 |
| 4,811,006 | 3/1989 | Kuijk | 340/719 |

FOREIGN PATENT DOCUMENTS 0217466 4/1987 European Pat. Off. ........... 340/784

Primary Examiner—Jeffery A. Brier
Assistant Examiner—M. Fatahiyar
Attorney, Agent, or Firm—Robert J. Kraus

[57] ABSTRACT

A matrix display device has row and column conductors (34,35) with display elements (32), e.g. liquid crystal elements, at their intersections each connected between a row and column conductor in series with a respective diode ring type bidirectional non-linear device (31) whose two branches each contain a plurality of diode elements. Some of the diode elements (e.g. A-C and G-I) of one or both branches (A-F and G-L) of one diode ring are shared with, and form part of, a respective branch or branches of a different diode ring or rings, with at least one other diode element of each branch (D-F and J-L) being dedicated solely to its associated display element. Thus the number of diode elements required is reduced. Further reduction can be achieved by arranging one or more diode elements of one branch to form part of the other branch of the same diode ring.

20 Claims, 4 Drawing Sheets

MATRIX DISPLAY DEVICE

BACKGROUND OF THE INVENTION

The present invention relates to a matrix display device comprising a plurality of row and column address conductors, a plurality of electro-optical display elements each of which is connected between a row conductor and a column conductor in series with a two terminal non-linear resistance device which comprises first and second parallel conduction branches capable of allowing current flow in respective opposite directions with each branch exhibiting a threshold characteristic and comprising a plurality of series-connected diode elements.

An active matrix display device of this kind is suitable for displaying alpha-numeric or video, e.g. TV, information.

Matrix display devices of the above kind using diode elements and in which the electro-optical display elements comprise liquid crystal display elements are well known. In these known forms of liquid crystal display devices, for example as described in GB-A-2,129,183, each display element is connected in series with a diode ring type of bi-directional non-linear resistance device having parallel branches which each contain series-connected diode elements between a row, scanning, conductor and a column, data, conductor.

The purpose of the diode ring circuit is to act as a switch in series with the display element. When a given row of the display device is to be addressed the voltage applied to the row conductor concerned is taken to one of two predetermined levels. The polarity of the voltage applied across the display element is periodically inverted, usually every field, to prevent unwanted degradation of the liquid crystal material and generally poor image quality.

During the "select" period the voltage across a diode ring circuit and its associated display element (and other diode rings and display elements in the same row) causes the diode ring to operate in the charging part of its circuit characteristic. In this region the diode ring circuit current is large and the display element capacitance rapidly charges to a voltage, depending on the voltage applied to the column conductor at that time, the select voltage applied to the row conductor, and the forward voltage drop across the diode ring circuit at the end of the charging period. At the end of the select period the row voltage falls to a new, lower, and constant value which is selected so that the mean voltage across the diode ring circuit during the subsequent interval until its assciated display element is next required to be addressed, usually in the succeeding field period for TV display, is minimized. In theory, assuming an ideal situation, this sustain or hold voltage is equal to the mean of the rms saturation and threshold voltages.

Under these conditions the maximum voltage of either polarity appearing across the diode ring circuit is equal to the peak to peak voltage on the column conductor, which in turn is equal to the difference between Vsat and Vth. As the voltage across the diode ring circuit increases larger leakage currents flow through the diodes and vertical crosstalk can appear. For a given level of display performance it is possible to derive a maximum acceptable diode voltage which can be controlled by varying the number of diode elements for each display element. Thus the diode ring circuit characteristics can be matched to the liquid crystal by suitable choice of the number of diode elements used.

Clearly, the smaller the difference between Vsat and Vth, the fewer diode elements are needed. However, a certain difference is needed to allow grey scale levels to be accurately reproduced. As the number of diode elements increase, so does the chance of producing a faulty diode element. Also, for a display device operated in transmission mode, and bearing in mind that the diode elements are usually fabricated side by side and situated laterally adjacent an electrode of their associated display element on a substrate of the display device, the effective optical transmission area of the display device becomes smaller as more diode elements are used, thereby producing a dimmer display for a given backlight power.

The effect of one diode element in the circuit becoming open circuit is that the diode ring circuit cannot conduct for one of the polarities of drive voltages and in this situation the voltage across the display element then has a different rms value from the correct one. The voltage also has a large 25 Hz component as well as a large dc component. The combined effect of these characteristics is that the display element has a different brightness, exhibits a 25 Hz flicker, and does not respond to changes in drive signal in the same way as other display elements. Such a display element is therefore seen as a visible defect in the display picture and renders the display device unacceptable for high quality display purposes. In order to alleviate this problem, it has been proposed in GB-A-2129183 mentioned earlier that two diode ring circuits be used for each display element so that, in the event of one diode ring circuit proving defective through an open-circuit diode element, the other diode ring circuit controls the display element as required to provide satisfactory operation. This proposal suffers from the disadvantage that the required duplication of diode rings complicates manufacture and leads to an even greater proportion of the display device's area being occupied by the diode rings and therefore still less active display area.

It is an object of the present invention to provide an improved matrix display device of the kind described in the opening paragraph.

More particularly it is an object of the present invention to provide a matrix display device using diode ring circuits as display element switching devices which requires fewer diode elements to be used than usual while retaining substantially the same or similar operational performance and thereby reducing the chances of a defective diode element occuring.

SUMMARY OF THE INVENTION

According to the present invention, a matrix display device of the kind described in the opening paragraph is characterized in that for each of a plurality of groups of display elements a part comprising at least one diode element of one branch of a non-linear resistance device associated with a first display element is common to, and forms part of, one branch of a non-linear device associated with a second display element, these two branches each containing at least one further diode element between its associated display element and the common part.

Thus, respective branches of the non-linear devices associated with two display elements share one or more diode elements. The at least one further diode element connected between the common part and the respective display element is unique to that display element and serves to maintain electrical isolation between the first and second display elements. Because one or more diode elements are common to the two non-linear devices, the number of diode elements necessary to constitute the two non-linear devices is reduced. This in turn lessens the chances of a fault occuring in the two non-linear devices concerned due to a defective diode element and also leads to a reduction in the amount of space needed by the two non-linear devices so that greater space is available for the display elements. With such sharing applied throughout the display device the advantages are significant.

For convenience and ease of fabrication the first and second display elements are preferably immediately adjacent one another, for example, successive elements in a row.

The benefits are further improved if, in a similar manner, a part of the other branch of the non-linear device associated with the first display element likewise is common to, and forms part of, one branch of a non-linear device associated with a different display element, again with these two branches concerned containing respectively at least one further diode element between their associated display element and this common part. The diode element or elements of this other common part are thus also shared by two branches so that further reduction in the number of diode elements necessary, and the advantages attendant with this reduction, are obtained.

Preferably, in order to reduce the risk of cross-talk problems, each branch with a common part contains at least two diode elements between its associated display element and the common part thereof, the remaining diode elements of the branch constituting the common part. It has been found that three diode elements unique to a respective display element are beneficial. The number of diode elements in a branch can be varied to suit individual display device requirements. Generally, however, each branch would consist of four to six diode elements. In a preferred embodiment exhibiting particularly good results, a branch contains six series diode elements, three of which constitute a part common to another branch and the other three of which closest to the associated display element are dedicated solely to that element.

Taking for example the case where each branch of the non-linear device associated with a display element has six diode elements, three of which are used for the common part and three of which are unique to an element, then the number of diode elements necessary for a given group of display elements is equivalent to nine per display element. This is a significant reduction compared with known display devices in which twelve diode elements per display element are required. Of course, greater reductions are achieved if fewer unique diode elements are used.

In an embodiment of the invention, the common parts of the two branches of the non-linear device associated with the first display element form respectively parts of branches of non-linear devices associated with two mutually-different display elements, which preferably are situated immediately adjacent the first display element, for example on opposite sides of the first element. Thus, considering three successive display elements A, B and C in a row, the common parts of the two branches of the non-linear device associated with display element B may form parts of the branches of the non-linear devices associated with the display elements A and C respectively. Similarly, parts of the non-linear devices associated with display elements A and C form respectively parts of the non-linear devices associated with their neighbouring display elements and so on. In this way, individual branches of a non-linear device can conveniently be located between the respective and adjacent display elements such that the two branches of a non-linear device associated with any particular display element are on opposite sides of the display element, thereby simplifying fabrication.

In order to provide redundancy, each branch may have associated therewith further diode elements each of which is connected in parallel with a respective one of the plurality of series-connected diode elements. In the event of one of the plurality of diode elements being open circuit because of a defect, the duplicate, parallel-connected, diode element ensures proper operation of the branch. For a non-linear device having, for example, five series-connected diode elements in each branch three of which are common the duplication of diode elements in this manner means that the number of diode elements required for a given group of display elements equates to fourteen per display element. For a known display device having separate diode rings for each display element and using a duplicated element redundancy scheme twenty diode elements per display element would be required.

In another embodiment of the invention, in which the branches of the non-linear devices each comprise at least three series-connected diode elements, at least one diode element intermediate the first and last of the series-connected diode elements of one branch of each non-linear device is interconnected in the other branch of the non-linear device so as to form a portion of that other branch intermediate its first and last diode elements. The diode element or elements which are shared between the two branches of a non-linear device in this way may be included in the parts of the two branches which are common also to branches of non-linear devices associated with another display element. Depending on the number of series-connected diode elements in a branch, a single diode element or a group of series-connected diode elements may be shared.

With this arrangement, therefore, in addition to diode elements being common to respective branches of two non-linear devices associated with two display elements, one or more of these diode elements is also shared between the two branches of the non-linear device associated with one of the display elements. Because the shared diode element(s) are included in the parts common to the two non-linear devices then effectively these shared diode element(s) are likewise shared between the branches of the non-linear device associated with the other display element. Hence the non-linear devices associated with two display elements may use diode elements common to all four of their branches, thereby reducing the numbers of diode elements necessary still further.

BRIEF DESCRIPTION OF THE DRAWINGS

Matrix display devices in accordance with the present invention will now be described, by way of example, with reference to the accompanying drawings, in which.

DETAILED DESCRIPTION OF THE INVENTION

Figure 1:
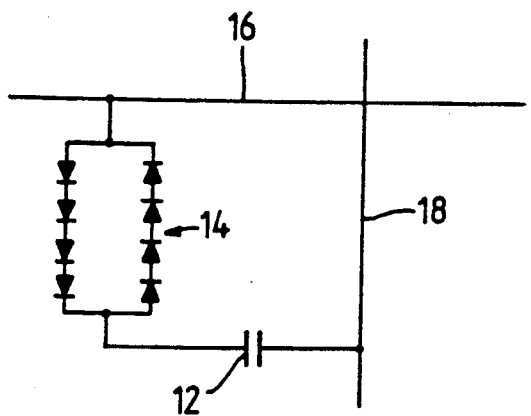
FIG. 1 illustrates schematically the circuit of a display element and diode ring connected between row and column address conductors in a known liquid crystal matrix display device.

Referring to FIG. 1, the liquid crystal display element, 12, of the known device is connected between a row, scanning, conductor 16 and a column, data, conductor 18 in series with a diode ring circuit type of bi-directional non-linear resistance device 14 comprising parallel branches which each contain series-connected diode elements (in this example four).

Figure 2:
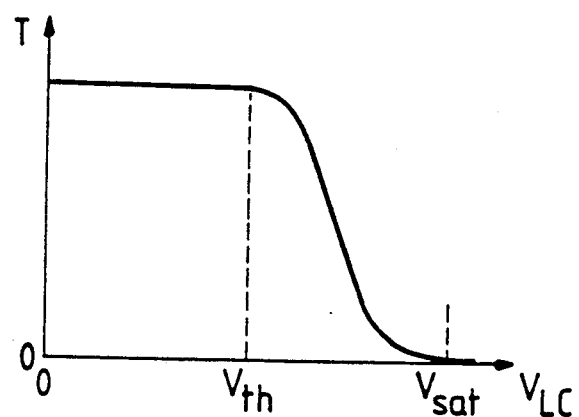
FIG. 2 illustrates graphically the transmission-voltage characteristic of a typical liquid crystal display element.
Figure 3:
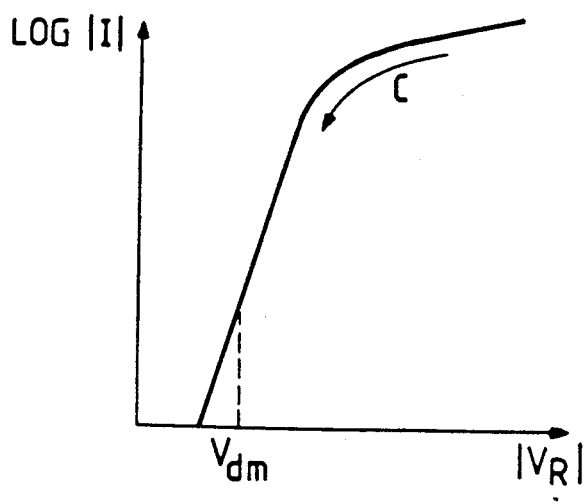
FIG. 3 illustrates graphically the current-voltage curve of a bidirectional non-linear resistance device, such as a diode ring, exhibiting a threshold characteristic.

The transmission (T)/RMS voltage (Vlc) curve of the liquid crystal material, and the current (I)/voltage ($V_R$) characteristic of the diode ring circuit are illustrated in FIGS. 2 and 3 respectively. The polarity of the voltage applied across the liquid crystal display element is periodically inverted, usually after every field. Since the operation of the display elements in the positive and negative cycles are exactly equivalent the following discussion will consider a cycle of only one polarity for simplicity.

During the select period, corresponding in the case of TV display to a maximum of a line period, a select voltage is applied to the row conductor and the resulting voltage across the diode ring circuit and display element (and other diode rings and display elements in the same row) causes the diode ring to operate in the charging part of its characteristic, indicated at C in FIG. 3. In this region the diode ring circuit current is large and the display element capacitance rapidly charges to a voltage according to the select voltage, the video information voltage applied to the column conductor at that time and the forward voltage drop across the diode ring circuit at the end of the charging period. At the end of the select period the row voltage is dropped to a new, constant value, the sustain voltage, selected so that the mean voltage across the diode ring circuit during the interval until the element is next addressed is minimised. For an ideal situation, this sustain voltage would be equal to the mean of the rms saturation and threshold voltages (as shown in FIG. 2).

The maximum voltage of either polarity then appearing across the diode ring circuit is equal to the peak to peak voltage on the column conductor which corresponds to the difference between the rms saturation and threshold voltages. As the voltage across the diode ring circuit increases larger leakage currents flow through the diodes and vertical crosstalk can appear. For a given level of display performance it is possible to derive a maximum acceptable diode voltage which is shown at Vdm in FIG. 3. This means that the display will only operate correctly if the difference between the rms saturation and threshold voltages is less than Vdm. Vdm is controlled by varying the number of diodes for each display element. The smaller the difference between the saturation and threshold voltages, the fewer diode elements are needed. However, for grey scale capability a certain difference is necessary. For a typical liquid crystal display device, four to six diode elements would normally be required in each branch of the diode ring. As the number of diode elements increases, so do, firstly, the chances of producing a faulty diode element and, secondly, the amount of space they occupy, thus reducing the active display area available. The present invention enables comparable results to be achieved as with these known devices while at the same time reducing the numbers of diode elements necessary.

Figure 4:
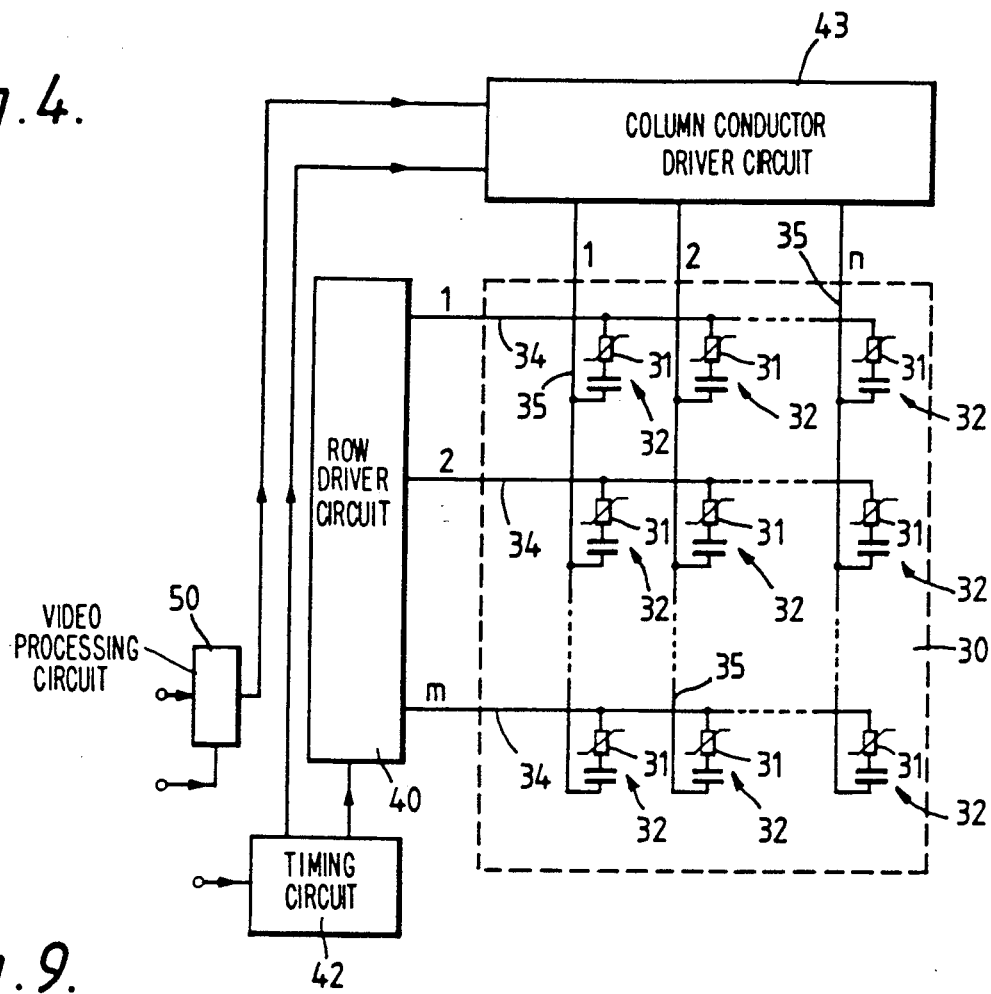
FIG. 4 is a simplified schematic block diagram of a liquid crystal matrix display device in accordance with the invention intended for displaying TV pictures and which comprises an array of individually-addressable display elements each of which is connected in series with a bidirectional non-linear resistance device between associated row and column conductors.

Referring now to FIG. 4, there is shown schematically and in simplified form a block diagram of a generalized LCD-TV matrix display device according to the invention whose active matrix addressed liquid crystal display panel 30 consists of m rows (1 to m) with n horizontal display elements 32 (1 to n) in each row. In practice, the total number of display elements (m.n) in the matrix array of rows and columns may be 200,000 or more. Each display element 32 consists of a liquid crystal material between two respective and opposing electrodes and is connected electrically in series with a bidirectional non-linear resistance device 31, which exhibits a symmetrical threshold characteristic and acts as a switching element, between a row address conductor 34 and a column address conductor 35. The current/voltage characteristic of the devices 31 is as shown in FIG. 3. The sets of row and column address conductors 34 and 35 are of conventional form comprising electrically conductive lines extending at right angles and carried on respective opposing faces of two, spaced, glass supporting plates (not shown) which also carry the display element electrodes adjacent to their crossover regions.

The row conductors 34 serve as scanning electrodes and are controlled by a row driver circuit 40 which applies a select voltage signal to each row conductor 34 sequentially in turn. By means of the timing circuit 42, data signals are applied in synchronism with the select signals to the column conductors 35 from column conductor driver circuit 43 connected to the output of a video processing circuit 50 to produce the required display from the rows of picture elements associated with the row conductors 34 as they are scanned. In the case of a video or TV display system these data signals comprise video information. The display elements 32 each have a transmission/voltage characteristic generally as shown in FIG. 2 enabling grey scale levels to be produced and are only activated to produce a display effect in response to the application of both the select and data signals. The optical transmissivity of a display element is controlled by the applied voltage to produce the required display effect and the individual display effects of the elements 32, addressed one row at a time, combine to build up a complete picture in one field, the picture elements being refreshed in a subsequent field.

The voltage/conduction characteristic of the two-terminal non-linear devices 31 is bidirectional, and substantially symmetrical with respect to zero voltage, so that by reversing the polarity of the select and data signal voltages after, for example, every complete field, a net dc bias across the display elements is avoided.

Because active matrix liquid crystal display systems employing two terminal non-linear resistance devices as switching elements are generally well known, the foregoing description of the display devices main features and general operation has deliberately been kept brief. Many earlier publications describing such types of display systems are available. For examples, reference is invited to U.S. Pat. No. 4,223,308, GB-A-2,129,183 and GB-A-2,147,135, details of which are incorporated herein.

The non-linear devices 31 of the display device of FIG. 4 consist of diode ring circuits and in this respect, the display device shares similarities with those described in GB-A-2129183A, although the form of the diode ring circuits used in the present invention differs, as will become apparent.

Row scanning is accomplished in conventional fashion using a waveform comprising a select signal portion of predetermined duration and magnitude followed immediately by a sustain signal portion of lower, but similar polarity, voltage for the remainder of the field period.

The diode ring circuits, as with known types described in GB-A-2129183, comprise an arrangement of diode elements providing first and second parallel conduction branches between first and second terminals connected respectively to a row conductor 34 and an electrode of the display element 32. The branches each consists of a plurality of series-connected diode elements and permit unidirectional current flow in opposite directions respectively for charging the associated display element to either polarity.

The diode ring circuits differ from the known diode ring circuits in that a part of one branch of a diode ring circuit associated with a certain display element is common to, and serves as part of, one branch of another diode ring circuit associated with a different display element. This common part, consisting of one or more adjacent diode elements in the series, in effect is shared between two diode ring circuits. In similar manner a part of the other branch of the diode ring circuit associated with that certain display element serves also as part of a branch of the diode ring circuit associated with either that different display element or another display element. Electrical isolation between the display elements concerned is maintained by each branch of each diode ring circuit having at least one further diode element connected between the shared part and its respective display element. This sharing of branch parts is used throughout the panel 30, except for diode rings circuits associated with display elements at the ends of rows and columns. For the sake of clarity, the sharing of diode elements by the non-linear devices has not been detailed in FIG. 4, the non-linear devices instead being shown as they would effectively be in operation of the display device.

Sharing of diode elements by non-linear devices associated with different display elements in this manner leads to a reduction in the overall numbers of diode elements required compared with known arrangements using a respective and individual non-linear device for each display element. Consequently there is a corresponding reduction in the chances of an open-circuit diode element being obtained in the display device.

An embodiment of the display device will now be described in greater detail with reference to FIG. 5 which shows the manner of the interconnection of a few, typical, display elements 32 and their associated non-linear devices. More particularly, four immediately adjacent display elements from one row, here referenced D1, D2, D3 and D4, and the complete diode ring circuits for two successive elements, D2 and D3, are shown.

Considering, for example, display element D2, one of the electrodes of this element is connected to a column conductor 35, while its other electrode, 50, is connected to a row conductor 34 via a diode ring circuit which comprises diode elements A-L. The first and second branches of this diode ring circuit, permitting current flow in respective opposite directions, consist of the series-connected diode elements A-F and G-L respectively. In this example, therefore, each branch comprises six diode elements. It will be appreciated though that the number of diode elements in a branch can be varied according to operational requirements as discussed previously.

The group of three diode elements G-I of the second branch also forms part of one branch of the diode ring circuit associated with the display element D3, this branch further including the diode elements M, N, O connected in series between the common group of diode elements G-I and the electrode 50 of display element D3. The diode elements J-L and M-O are unique to display elements D2 and D3 respectively and serve to isolate these two display elements from one another.

The other branch of the diode ring circuit associated with the display element D3 is constituted by the five series-connected diodes P-U.

In similar manner, the groups of diode elements A-C and P-R form respective parts of branches of the diode ring circuits associated with the display elements D1 and D4, these branches likewise including respective isolating diode elements for example V-X. The other branches of the diode ring circuits associated with the display elements D1 and D4, not shown in FIG. 5, also share their first three diode elements with their respective immediately adjacent display elements and so on for other display elements of the row. The circuit configuration for other rows of display elements in the device are identical. The diode ring circuits for the first and last display elements in the rows will each have one branch whose diode elements are associated with just those display elements and not shared. In operation, the diode ring circuits obtained behave in similar fashion to conventional diode ring circuits.

The number of diode elements in a branch which are commonly connected in the above-described way may be varied. Thus, for example, in the above arrangement using six diode ring circuits (six diode elements in each branch) either the first one, two, four or five diode elements could be shared with the remaining diode elements or element being dedicated and unique to just one diode ring circuit. However, in order to prevent the possibility of cross-talk problems, it is considered desirable, although not essential, to provide two, and preferably three, such unique diode elements in a branch. The diode elements exhibit self capacitance and have capacitive coupling effects. It is important that cross-talk is minimized, particularly for proper operation of a colour display where adjacent display elements are often required to handle widely differing voltages so that the effects of cross-talk can be especially noticeable. In a monochrome display, blurring effects can occur. While one or two diode elements unique to a branch can provide acceptable results for some display requirements, it has been found that three unique diode elements are better for high quality colour TV displays.

Figure 5:
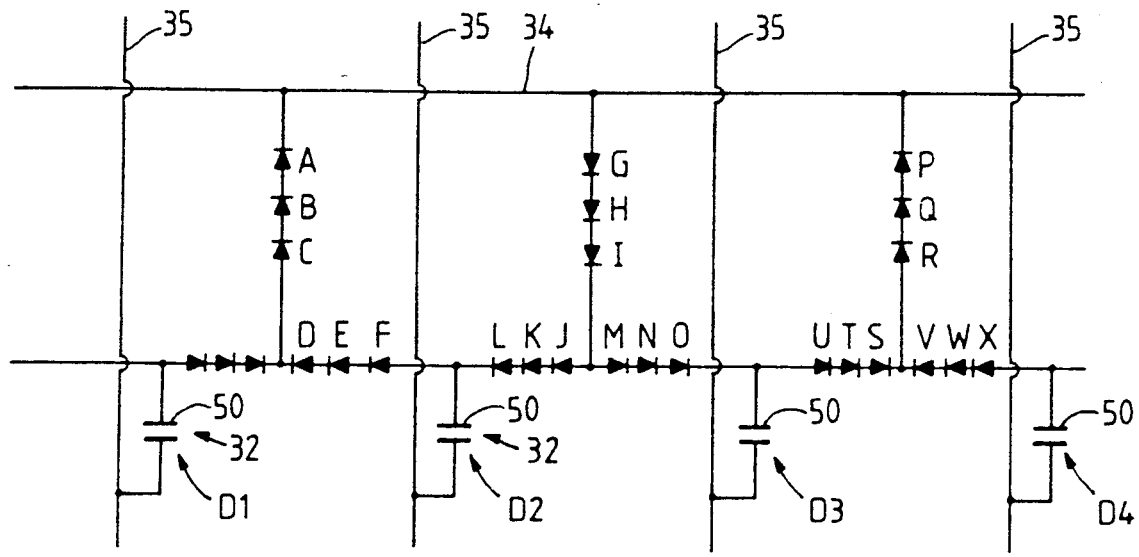
FIG. 5 illustrates schematically the circuit configuration of a typical few of the display elements and their associated non-linear devices of a first embodiment of the display device.
Figure 6:
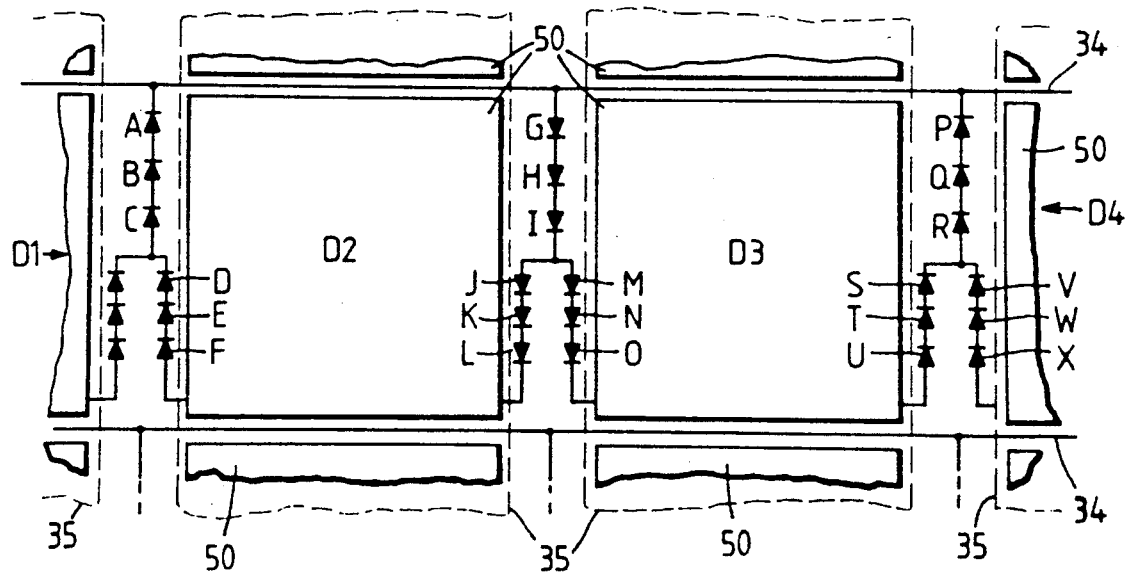
FIG. 6 is a plan schematic view of part of the display device of FIG. 5.

FIG. 6 illustrates schematically and in plan view a preferred physical configuration for the portion of the display device represented in FIG. 5. The diode ring circuits, display element electrodes 50 and row conductors 34 are carried on one of the supporting plates. The column conductors 35, shown in dashed line form, are carried on the opposing supporting plate with portions of the conductors 35 which overlie the electrodes 50 constituting the second electrodes of the display elements.

As shown, the common diode elements, (for example G-I), are conveniently located between the electrodes 50 of the display elements (D2 and D3) with which they are associated together with the unique diode elements, (J-L and M-O) and their interconnections. The two branches associated with any one display element are located on opposite sides of the electrode 50 of that element.

Using the described sharing scheme, then for a six diode ring circuit it is necessary to provide only nine diode elements between adjacent display element electrodes 50 compared with twelve diode elements for an equivalent conventional diode ring circuit. Advantage can be taken of this reduction in diode element numbers and the extra space which becomes available in various different ways. For example, within a given display area, the area of individual display elements can be increased. Alternatively, the diode elements can be increased in size making alignment less critical. In another example, the extra space can be utilized to accommodate more readily additional diode elements for redundancy purposes.

Figure 7:
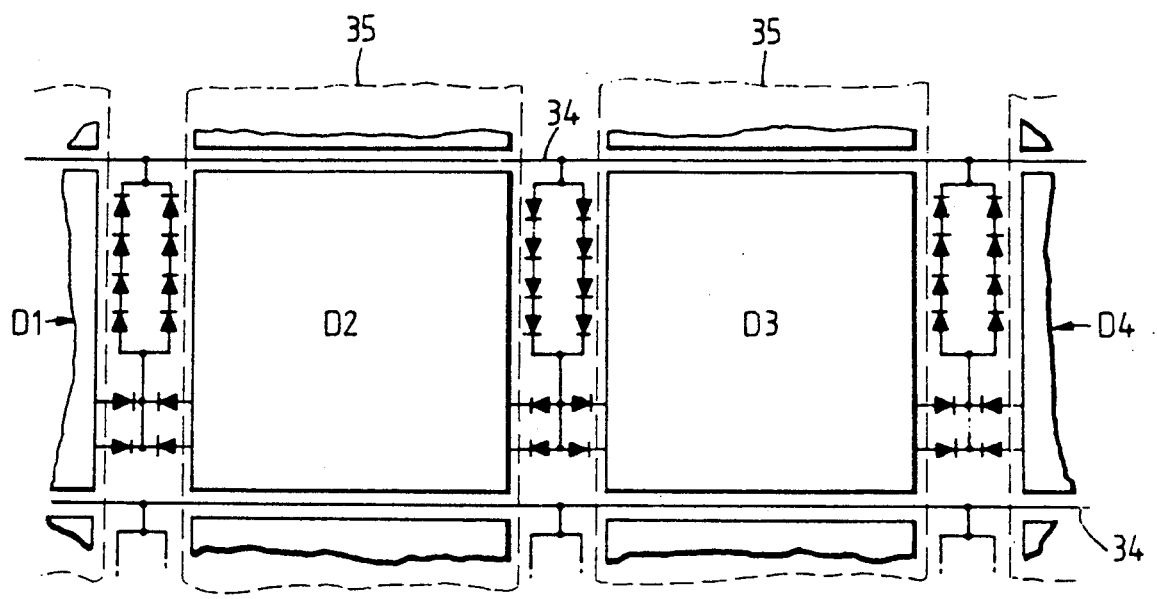
FIG. 7 shows a modified form of the display device of FIG. 6 offering redundancy.

FIG. 7 illustrates a portion of a modified form of a display device similar to that of FIG. 6 but in which each branch consists of five diode elements, four of which constitute a common part and one of which, closest to the display element, is unique to its associated display element, and which offers redundancy. In this modified device, additional diode elements are each connected in parallel with a respective diode element of the diode ring circuit branches. The resulting duplication of diode elements ensures that if one or more elements in a branch is defective, proper operation of the branch is maintained by virtue of the parallel diode element. While the provision of redundant diode elements doubles the number of diode elements required there is still a considerable reduction on the number required in known display devices offering comparable redundancy by simple duplication.

Figure 8:
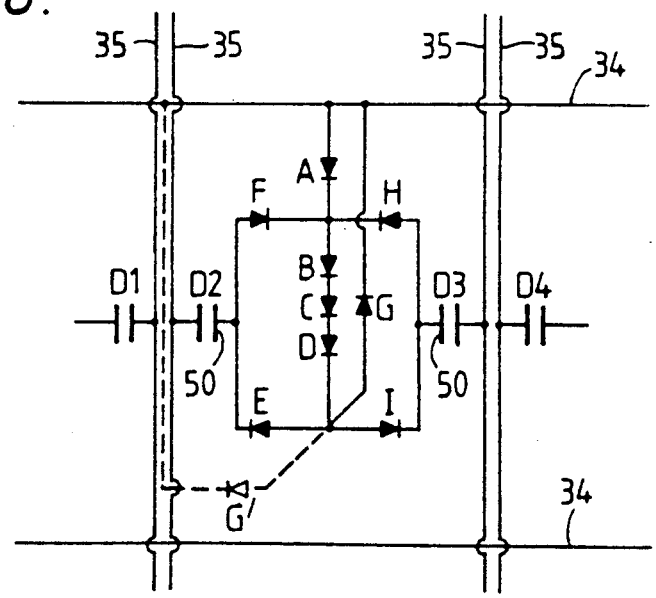
FIG. 8 illustrates schematically the circuit configuration of a typical few of the display elements and their associated non-linear devices of a second embodiment of the display device.

Referring now to FIG. 8, there is shown the circuit configuration of a part of another embodiment of display device according to the invention. More particularly, this Figure shows four adjacent display elements in a row, here again referenced D1-D4, and the diode ring circuits for two typical display elements, D2 and D3. Components corresponding with those in the previous embodiment have been designated the same references. As in the previous embodiment, the diode ring circuits are connected in series with their display elements between respective column conductors 35 and a row conductor 34 common to all display elements in the same row. Also as before, a part of one conduction branch of a diode ring circuit associated with one display element serves also as a part of a conduction branch of another diode ring circuit associated with a different display element. In this particular example, each branch comprises five diode elements, four of which constitute a common part, the remaining diode element of a branch being unique to the display element associated with that branch.

This embodiment differs from the previous embodiment however firstly, in that respective parts of the two conductive branches of a diode ring circuit associated with one display element are shared by the two conduction branches of the diode ring circuit associated with just one, different, display element, and, secondly, in that in each diode ring circuit associated with one display element one or more diode elements in one conduction branch intermediate the first and last diode elements in the series of that branch forms also a portion of the other conduction branch of that diode ring circuit intermediate the first and last diode elements that other branch. Thus, in addition to diode elements being shared by conduction branches of diode ring circuits associated with different display elements, diode elements are also shared by the two conduction branches of an individual diode ring circuit. This leads to yet further reduction in the number of diode elements required.

The one or more diode elements shared between the two conduction paths of one diode ring circuit are interconnected in the two branches in such a fashion that the shared diode element(s) form the only current paths in the two branches while the diode element(s) allows current flow in one direction for one branch and in the opposite direction for the other branch.

Because also parts of the two conduction branches of one diode ring circuit are common to another diode ring circuit associated with a different display element, the sharing of diode element(s) by the two branches of the one diode ring circuit in addition means that diode element(s) in the two branches of the other diode ring circuit are also shared.

Referring again to FIG. 8, and considering the display element D2 for example, the associated diode ring circuit connected between the row conductor 34 and its electrode 50 comprises the diode elements A-G with one conduction branch being constituted by the five series-connected diode elements A, B, C, D and E and the other conduction branch, which is parallel to the one conduction branch but in which the polarity of the diode elements is in the opposite sense to allow current flow in the reverse direction, being constituted by the five series-connected diode elements G, D, C, B and F. Hence, the group of three diode elements B, C and D are common to both conduction paths, the manner of their interconnection between the other diode elements of the two branches, A and E, and G and F respectively, allowing them to operate in the desired conduction direction for the two branches.

Considering now the display element D3, the diode ring circuit associated with this display element comprises, again, the diode elements A, B, C, D and G and in addition the diode elements H and I with its one conduction branch being constituted by the series-connected diode elements A, B, C, D and I and its other conduction path being constituted by the series-connected diode elements G, D, C, B and H. The diode elements B, C and D are therefore common to both conduction branches of this diode ring circuit. Moreover, the groups of diode elements A–D and G, D, C, and B constituting parts of the respective two branches of the diode ring circuit associated with display element D2 are shared by, and thus form respective parts of the two branches of the diode ring circuit associated with the display element D3.

For a five diode ring circuit this sharing of diode elements means that for a given group of display elements (excluding those at either end of the rows which will have one branch whose diode elements are unique to those individual display elements) only four and one half diode elements per display element are necessary.

While in the above example, five diode ring circuits are employed, it will be appreciated that, as with the previous embodiment, this number can be varied. Moreover, the number of diode elements in each branch which are unique to the associated display element can be increased to obviate possible cross-talk problems as previously discussed. Bearing in mind that in order to allow sharing of diode elements between the two conduction branches of a single diode ring circuit the shared diode element or elements should be intermediate at least one diode element at either end of the branch (e.g. A and E) then the minimum number of diode elements in a branch is three.

In a modification of the circuit shown in FIG. 8, which avoids forming a cross-over in the line connecting diode element G to the row conductor 34, this diode element may instead be arranged as shown at G'.

The diode ring circuits of each adjacent pair of display elements in each row, except for the first and last display elements or each row, follow the configuration shown in FIG. 8.

Figure 9:
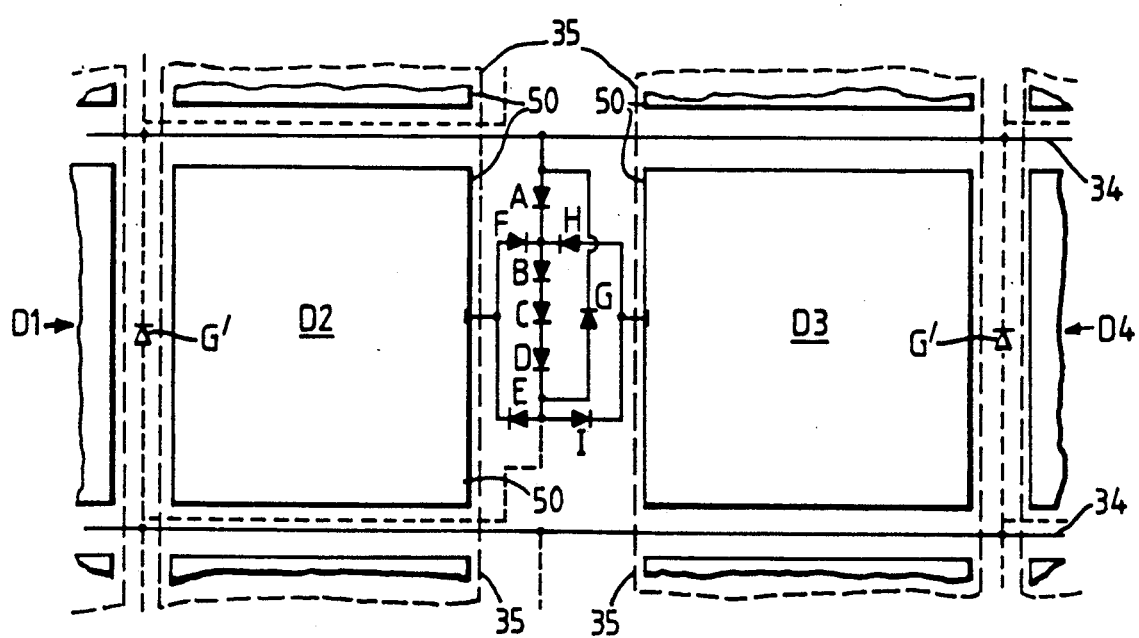
FIG. 9 is a plan schematic view of part of the display device of FIG. 8.

FIG. 9, which is similar in respects to FIG. 6, shows schematically in plan view the part of the display device whose circuit is illustrated in FIG. 8. The connections of the alternative diode elements G, and G' are indicated from which it is seen that the use of diode element G' would involve a connecting line extending around the electrode 50 of a display element D2. However, at least most of the components of the diode ring circuits associated with two display elements, depending on which alternative configuration is adopted, are readily located between the electrodes 50 of the display elements concerned.

The considerable reduction in the numbers of diode elements required by virtue of the extensive sharing of diode elements utilized in this embodiment means that the area of the electrodes 50 can be increased, or that the size of the diode elements can be made greater, making alignment less critical. In addition, the smaller number of diode elements needed means that for a given probability of one diode element failing the chance of a display element not being driven correctly is reduced.

The diode elements and their interconnections forming the diode ring circuits may be fabricated using any suitable technology, for example in a manner similar to that described in GB-A-2129183. Preferably the diode elements are formed as amorphous silicon p-i-n devices.

While in this specification reference is made to row and column conductors it will be appreciated that the invention is applicable to display devices in which the described row and column conductors are interchanged with the row conductors becoming the column conductors and vice versa. Also, it is envisaged that other passive electro-optical materials such as electrophoretic and electrochromic materials could be used instead of liquid crystal material.

I claim:

1. A matrix display device comprising a plurality of row and column address conductors, a plurality of electro-optical display elements each of which is connected between a single row conductor and column conductor in series with a two terminal non-linear resistance device which comprises first and second parallel conduction branches capable of allowing current flow in respective opposite directions with each branch exhibiting a threshold characteristic and comprising a plurality of series-connected diode elements, characterized in that for each of a plurality of groups of display elements a part comprising at least one diode element of a second branch of a non-linear resistance device associated with a first display element is common to, and forms part of, a first branch of a non-linear device associated with a second display element, said second and first branches of said first and second display elements respectively each containing at least one further diode element between its associated display element and the common part.

2. A matrix display device according to claim 1, wherein the first and second display elements are immediately adjacent one another.

3. A matrix display device according to claims 1, wherein a second part, comprising at least one diode element of a first branch of the non-linear device associated with the first display element, is common to, and forms part of, a second branch of a non-linear device associated with a third display element, said first branch of said first display element and said second branch of said third display element respectively each containing at least one further diode element between its associated display element and said second common part.

4. A matrix display device according to claim 3, wherein each branch having a common part contains a first group of at least two diode elements disposed between its associated display element and its common part.

5. A matrix display device according to claim 4, wherein each branch having a common part contains a second group comprising those of said diode elements which are not part of said first group which constitute the common part thereof.

6. A matrix display device according to claim 3, wherein the common parts of the two branches of the non-linear device associated with the first display element form respectively parts of branches of non-linear devices associated with two mutually-different display elements.

7. A matrix display device according to claim 6, wherein said two mutually-different display elements are situated immediately adjacent the first display element.

8. A matrix display device according to claim 1, wherein the branches of the non-linear devices each have associated therewith a plurality of further diode elements each of which is connected in parallel with a respective one of said plurality of series-connected diode elements.

9. A matrix display device according to claim 1, wherein the branches of the non-linear devices each comprise at least three series-connected diode elements, and at least one intermediate diode element disposed between the first and last of the series-connected diode elements of said first branch of each non-linear device is interconnected with its said second branch.

10. A matrix display device according to claim 9, wherein a first intermediate diode element of said first branch is included in a branch of another non-linear device associated with another display element.

11. A matrix display device of claim 1, wherein the electro-optical display elements comprise liquid crystal elements.

12. A matrix display device according to claim 2, wherein a second part, comprising at least one diode element, of a second branch of the non-linear device associated with the first display element, is common to, and forms part of, a first branch of a non-linear device associated with a third display element, said second branch of said first display element and said first branch of said third display element respectively each containing at least one further diode element between its associated display element and this common part.

13. A matrix display device according to claim 12, wherein each branch having a said common part contains at least two diode elements between its associated display element and the common part thereof.

14. A matrix display device according to claim 4, wherein the common parts of the two branches of the non-linear device associated with the first display element form respectively parts of branches of non-linear devices associated with two mutually-different display elements.

15. A matrix display device according to claim 5, wherein the common parts of the two branches of the non-linear device associated with the first display element form respectively parts of branches of non-linear devices associated with two mutually-different display elements.

16. A matrix display device according to claim 12, wherein the common parts of the two branches of the non-linear device associated with the first display element form respectively parts of branches of non-linear devices associated with two mutually-different display elements.

17. A matrix display device according to claim 15, wherein said two mutually-different display elements are situated immediately adjacent the first display element.

18. A matrix display device according to claim 7, wherein the branches of the non-linear devices each have associated therewith a plurality of further diode elements each of which is connected in parallel with a respective one of said plurality of series-connected diode elements.

19. A matrix display device according to claim 7, wherein the branches of the non-linear devices each comprise at least three series-connected diode elements, and at least one intermediate diode element disposed between the first and last of the series-connected diode elements of said first branch of each non-linear device is interconnected with its second branch .

20. A matrix display device according to claim 19, wherein a first intermediate diode element of said first branch is included in a branch of another non-linear device associated with another display element.

* * * * *